No. 858,094. PATENTED JUNE 25, 1907.
C. D. MONTE, DEC'D.
V. J. MONTE, ADMINISTRATRIX.
APPARATUS FOR REMOVING THE SKINS OF FRUITS AND VEGETABLES.
APPLICATION FILED APR. 6, 1905.
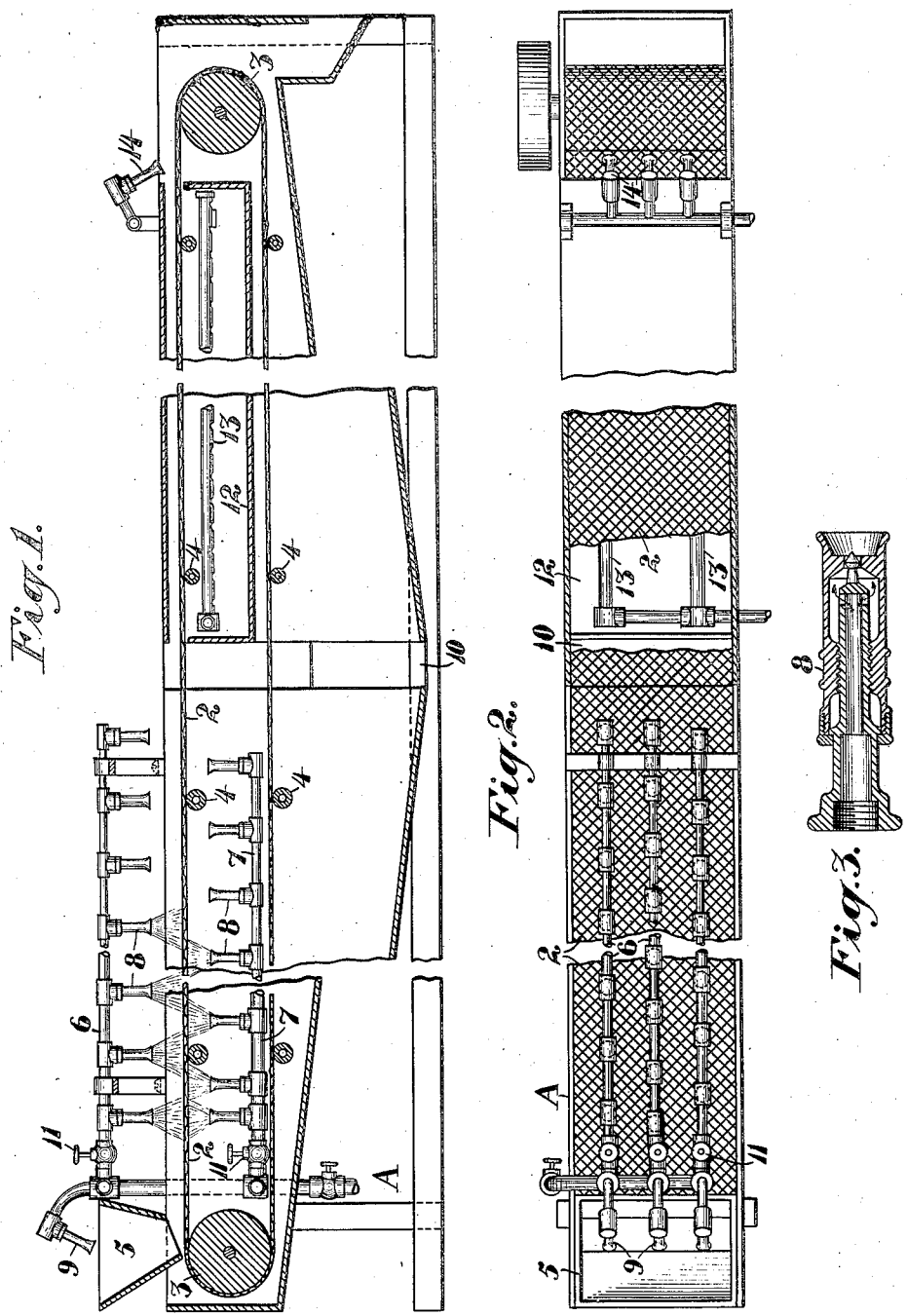
Witnesses:
Inventor,

UNITED STATES PATENT OFFICE.

CIPRIANO D. MONTE, OF SAN FRANCISCO, CALIFORNIA; VIRGINIA J. MONTE ADMINISTRATRIX OF SAID CIPRIANO D. MONTE, DECEASED.

APPARATUS FOR REMOVING THE SKINS OF FRUITS AND VEGETABLES.

No. 858,094.                Specification of Letters Patent.            Patented June 25, 1907.

Application filed April 6, 1905. Serial No. 254,138.

*To all whom it may concern:*

Be it known that I, CIPRIANO D. MONTE, a citizen of the United States, residing at the city and in the county of San Francisco and State of California, have invented new and useful Improvements in Apparatus for Removing the Skins of Fruits and Vegetables, of which the following is a specification.

My invention relates to an apparatus for removing the skins of fruits and vegetables after treatment by a chemical process to loosen the skins from the meat, and for washing and blanching the same preparatory to canning.

The object of my invention is to provide a satisfactory means for effectually removing the skins and also for thoroughly eradicating every trace of the solution by which the peel is loosened so that as the fruit leaves the apparatus it is ready for the cans.

The invention consists of the parts and the construction and combination of parts as hereinafter more fully described and claimed, having reference to the accompanying drawings, in which—

Figure 1 is a longitudinal vertical section of my apparatus. Fig. 2 is a plan view of same. Fig. 3 is a sectional view of the adjustable nozzle.

A represents a suitable frame supporting suitable conveying means as the carrier 2. Any desired form of carrier may be used to advance the material through the apparatus so long as it is sufficiently perforated or reticulated to offer no substantial resistance to the action of a jet of water directed from either above or below upon the material on the carrier. As here shown this carrier consists of an endless strip of wire mesh, passing over drums 3 at the ends of the frame and supported at suitable points in its length on the rollers 4. The carrier is driven at appropriate speed from either end of the frame and from any suitable source of power.

Arranged above and beneath a part of the conveyer adjacent to the feed end of the apparatus, are suitable means for directing opposing sprays of water upon the carrier; the object being that when the fruit or vegetables, which have been previously dipped in a vat containing a heated solution to loosen the skin from the meat, are fed from hopper 5 on to the carrier, they will be subjected to innumerable jets from every direction and impinging on all sides to remove the skins and to thoroughly wash and rinse the peeled fruit or vegetables.

As shown, peeling by hydraulic means is accomplished as follows: 6—7 represent two series of water pipes connected with any convenient source of pressure water-supply; one series 6 being disposed above and parallel with the carrier and the other 7 disposed similarly below the upper plane of the carrier and each pipe of each series having adjustable nozzles 8 of any approved pattern by which a plurality of sprays both above and below the carrier will be directed against the material on the carrier. Each nozzle is separately adjustable so that any one or all of the nozzles may be turned off to provide a more or less extended sprayed area according to the quantity and location of the fruit on the carrier, and according to the ripeness of the fruit. If the fruit or other material undergoing treatment is very ripe it can stand less spraying and less force from the jets than where the material is greener or firmer. Furthermore the several nozzles above and below are staggered so that the material on the carrier is subjected to a more complete and better action of the sprays. The fruit when first delivered into the hopper 5 is subjected to a preliminary spraying by the nozzles 9. The carrier may be inclosed to contain the splash, the used water flowing down a drain board to a central discharge 10. The pipes 6—7 are made up each of sections of different sizes gradually growing smaller toward the end of the machine away from hopper 5, or from the point where the pipes connect with the supply pipe. The force of the sprays is only enough to remove the peelings and thoroughly wash the fruit. The flow of water to pipes 6—7 and the force of the sprays are regulated by valves 11. The extent of the zone wherein the fruit is subjected to the sprays is sufficient for all peeling and cleansing purposes. Passing beyond the sprays, the carrier enters a steam box 12 and the material on the carrier is subjected to a steaming process for a sufficient time to properly remove all traces of solution and to blanch and shrink the same. Steam for box 12 is admitted through the perforated pipes 13. The drain from the steam box is led to the central discharge 10. Leaving the steam box the fruit now perfectly peeled, cleansed and blanched is chilled and set by a series of sprays discharging from the adjustable nozzles 14, and is now ready for cooking and canning.

This apparatus is adapted for the handling of all sorts of fruit such as peaches, apricots, pears, etc., and vegetables such as tomatoes, beets and the like. Drupaceous fruits such as peaches and apricots are usually first pitted. The advantage of the double spraying above and below with halved fruit of this character is obvious since much of the fruit will travel flat on the carrier, and if only sprayed from above the inside of the fruit would not be washed at all. By the two sets of sprays every part of a halved peach for example is acted on many times and every trace of the lye solution and every particle of peel are removed. This method of peeling and washing does not harm the fruit in the slightest manner as has been proven by actual practice, and is much cleaner than the usual hand method.

It is obvious that various changes and modifications are possible in my invention without departing from the principle thereof, and I do not wish to be understood as limiting myself to the specific construction herein shown and described.

Having thus described my invention, what I claim and desire to secure by Letters Patent is—

1. A peeling and washing machine having in combination a supporting frame, a movable carrier mounted therein, and upon which the fruit or vegetable to be peeled is supported, fluid-supply pipes having nozzles adapted to discharge jets under pressure upon the fruit to remove the skin thereof, said nozzles being independently-adjustable to enable any one or all of the nozzles to be turned off to provide a more or less extended sprayed area according to the condition of the fruit.

2. A peeling and washing machine having in combination a supporting frame-work, an endless-carrier operable therein fluid jet-pipes at one end of the frame-work adapted to deliver jets upon the fruit supported on a conveyer, a steam chamber intermediate of the ends of the conveyer and through which the conveyer carries the fruit, and other fluid-jets beyond the steam chamber adapted to deliver jets upon the fruit after leaving said chamber whereby the fruit is chilled and set.

3. An apparatus for removing the skins of fruit and vegetables comprising a suitable perforated conveyer, one or more water pipes arranged above and parallel with the conveyer and provided with independently longitudinally adjustable nozzles discharging downward on the conveyer, and one or more water pipes arranged parallel with and below the conveyer and having a plurality of individually adjustable nozzles discharging upwardly against the conveyer.

4. In an apparatus of the character described, the combination of a suitable conveyer, a series of water pipes arranged above the conveyer and provided with a plurality of downwardly discharging nozzles, a second series of pipes disposed below the conveyer and provided with a series of upwardly discharging nozzles, said conveyer perforated to allow all of said nozzles to act directly upon the material on the conveyer, a steam box through which the conveyer passes, for heating the material on the conveyer after it leaves the sprays and a spray pipe beyond the steam box for suddenly chilling the material as it leaves said heating means.

In testimony whereof I have hereunto set my hand in presence of two subscribing witnesses.

CIPRIANO D. MONTE.

Witnesses:
S. H. NOURSE,
JESSIE C. BRODIE.